(12) United States Patent
Belanger et al.

(10) Patent No.: US 6,372,053 B1
(45) Date of Patent: Apr. 16, 2002

(54) ROLLOVER PRESSURE CAR WASH APPARATUS AND METHODS OF OPERATING SAME

(76) Inventors: Michael J. Belanger, 21300 Chase Dr., Novi, MI (US) 48375; Robert J. Wentworth, 37924 Stableview, Farmington Hills, MI (US) 48335

( * ) Notice: Subject to any disclaimer, the term of this patent is extended or adjusted under 35 U.S.C. 154(b) by 0 days.

(21) Appl. No.: 09/411,821

(22) Filed: Oct. 1, 1999

(51) Int. Cl.⁷ .............. B08B 3/00; H01H 3/14; G05B 23/02; G05B 9/02; H02P 1/42
(52) U.S. Cl. .......... 134/34; 134/58 R; 134/123; 134/172; 239/550; 239/565; 239/566; 239/750; 239/751; 239/752; 239/753
(58) Field of Search .............. 134/34, 123, 172, 134/58 R; 239/550, 566, 565, 750, 751, 752, 753

(56) References Cited

U.S. PATENT DOCUMENTS

| | | | |
|---|---|---|---|
| 3,300,803 A | | 1/1967 | Seakan |
| 3,425,080 A | | 2/1969 | Dolitzsch et al. |
| 3,428,983 A | | 2/1969 | Seakan |
| 3,573,862 A | * | 4/1971 | Brown .................. 134/57 |
| 3,593,730 A | * | 7/1971 | Burchett ................ 134/123 |
| 3,599,650 A | * | 8/1971 | Abraham ............... 134/123 |
| 3,604,434 A | * | 9/1971 | Hurst .................... 134/58 |
| 3,645,282 A | * | 2/1972 | Kurronen .............. 134/45 |
| 3,650,281 A | * | 3/1972 | Hurst .................... 134/58 R |
| 3,701,356 A | * | 10/1972 | Hanna et al. .......... 134/58 R |
| 4,305,174 A | | 12/1981 | Pyle et al. |
| 4,453,284 A | | 6/1984 | Schleeter |
| 4,716,916 A | * | 1/1988 | Hodge .................. 134/123 |
| 4,848,383 A | * | 7/1989 | Buhler .................. 134/123 |
| 4,933,016 A | * | 6/1990 | Carlson ................. 134/18 |
| 5,016,662 A | | 5/1991 | Crotts et al. |
| 5,033,490 A | | 7/1991 | Wade et al. |
| 5,160,430 A | | 11/1992 | Gasser et al. |
| 5,161,557 A | | 11/1992 | Scheiter, Jr. |
| 5,255,695 A | * | 10/1993 | Downey ................ 134/123 |
| 5,291,906 A | * | 3/1994 | White ................... 134/123 |
| 5,452,859 A | | 9/1995 | Flaxman |
| 5,575,852 A | | 11/1996 | Chase |
| RE36,483 E | * | 1/2000 | Chase .................... 118/680 |
| 6,237,614 B1 | * | 5/2001 | Retter ................... 134/99.1 |

OTHER PUBLICATIONS

AutoLaundry News, May, 1999 p. 11.

* cited by examiner

Primary Examiner—Randy Gulakowski
Assistant Examiner—Yolanda E. Wilkins
(74) Attorney, Agent, or Firm—Young & Basile

(57) ABSTRACT

A variable pressure spray type vehicle laundry apparatus in which a carriage is mounted for longitudinal displacement along overhead parallel beams and an inverted L shaped spray arm carrying both horizontally and vertically directed nozzles circumscribes the vehicle to be laundered. In the preferred embodiment two reversely similar L shaped spray arms are used and caused to operate through a butterfly type cycle to spray various fluids at different pressures on the vehicle. For low pressure operations, the twin arm system is centered over the vehicle and both spray arms are supplied with low pressure fluid at the same time. For high pressure operations, the left and right spray arms are operated in sequence and each is maintained at an optimal spray arm to vehicle spacing during its operating cycle. The carriage is provided with a laterally translatable shuttle structure for this purpose.

28 Claims, 9 Drawing Sheets

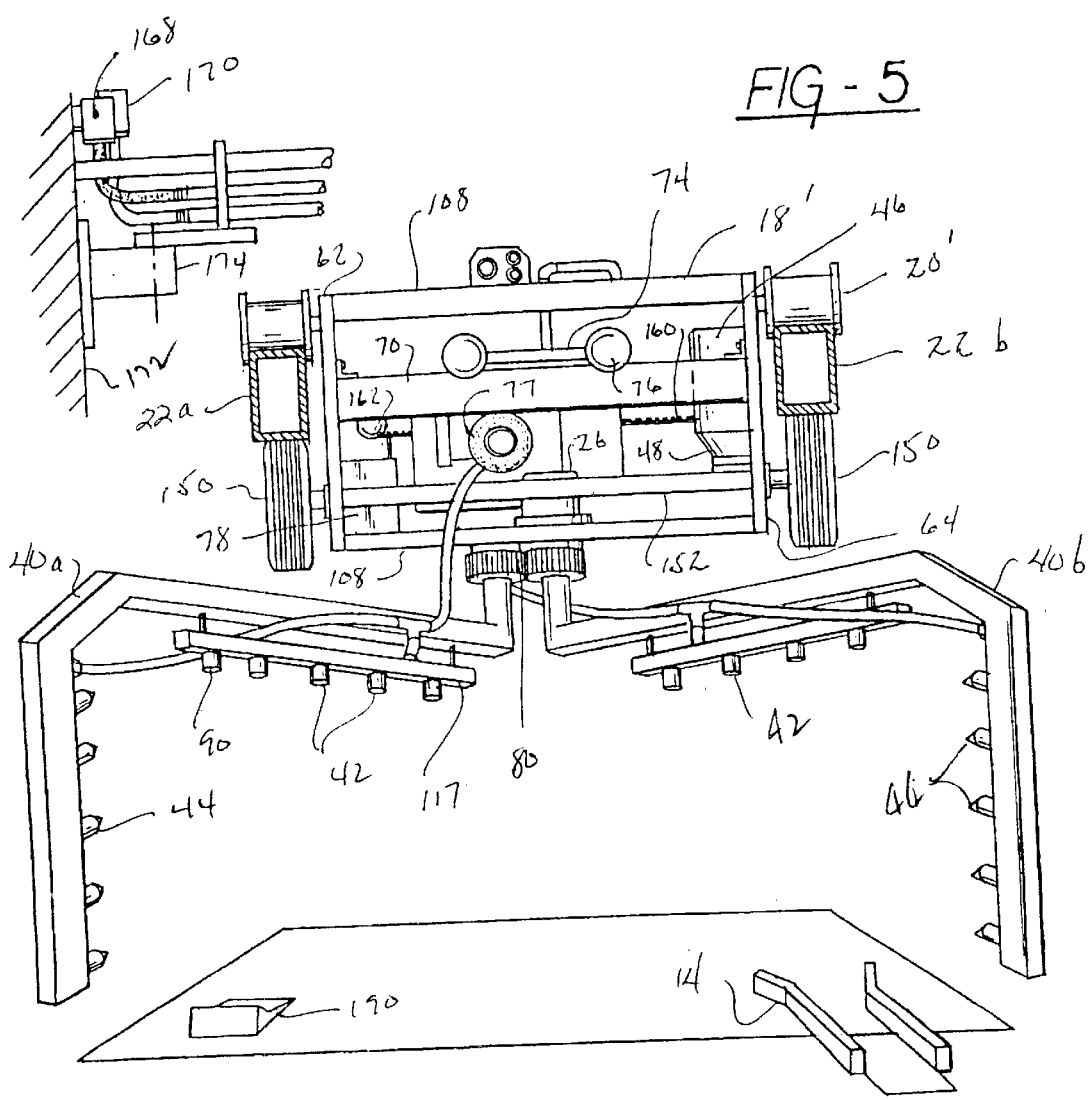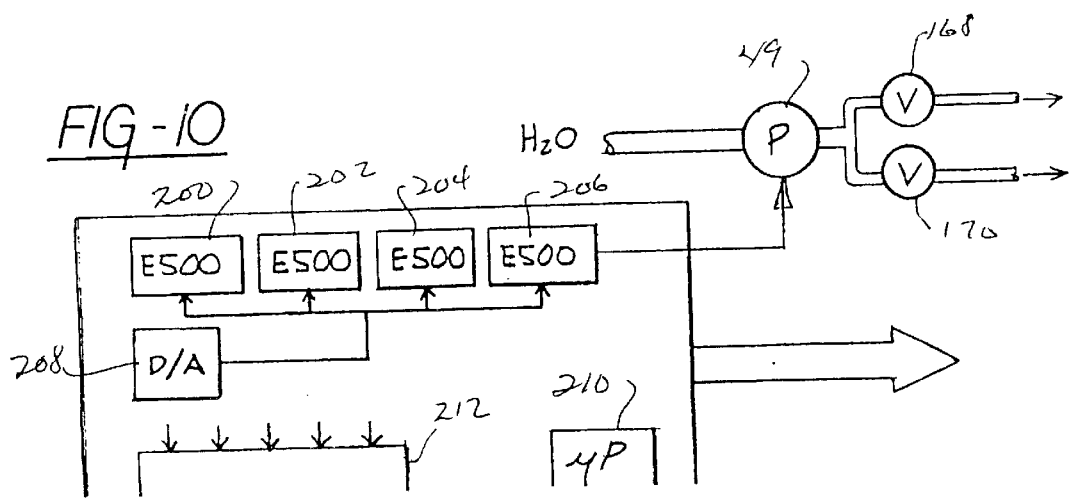

ROLLOVER PRESSURE CAR WASH APPARATUS AND METHODS OF OPERATING SAME

FIELD OF THE INVENTION

This invention relates to systems for causing one or more spray nozzle support arms to traverse a path which circumscribes an object such as an automobile as well as to operating methods therefor. The invention and the various sub-combinations thereof are advantageously applied to a vehicle laundry of the rollover type.

BACKGROUND OF THE INVENTION

The manufacture, sale and operation of automobile laundering equipment is big business in the United States and many other countries. The term "automobile laundering", as used herein, refers to wet washing the external surfaces of virtually any type of vehicle from ordinary passenger cars to busses, trucks, vans and even train cars and airplanes. Moreover, the principles and structures described herein can be applied to any fluid spray system including, by way of example, painting, prepping and corrosion-proofing.

One of the most popular forms of vehicle laundering equipment is the so-called "rollover" washer which is characterized by a washing structure which moves over or around a vehicle parked in a pre-specified area. Rollover equipment typically occupies less space than the traditional tunnel or conveyor washer and is often preferred by car dealers, service stations and convenience stores with collateral vehicle laundries for that reason.

Rollover washers can have brushes which contact the surfaces of the vehicle; see for example U.S. Pat. No. 3,428,983 issued Feb. 25, 1969 to R. Seakan and U.S. Pat. No. 4,453,284 issued Jun. 12, 1984 to R. Schleeter. An alternative approach, preferred by many because of the absence of physical contact between the washing apparatus and the vehicle, is the pressure washer, an example of which is illustrated in U.S. Pat. No. 5,016,662 issued May 21, 1999 to Crotts and Rambo. Another example is illustrated in U.S. Pat. No. 5,161,557 issued Nov. 10, 1992 to L. Scheiter.

The Seakan, Schleeter, Crotts et al and Scheiter systems are all of the "gantry" type; i.e., they all involve the use of an arch-shaped structure which rolls forward and backward along spaced, parallel floor tracks while passing over the vehicle. Crotts et al recognizes the desirability of laterally adjusting the position of the spray bars on one side of the arch according to variations in vehicle width.

Non-gantry pressure washers are also known in the art. One such washer comprises an overhead support for an inverted L-shaped spray arm which carries both vertically and horizontally-aimed spray nozzles and which can move longitudinally, laterally, and pivotally to circumscribe a parked vehicle. The pivot point for the spray arm is essentially at the intersection of the vertical and horizontal legs of the arm. This creates certain inefficiencies; for example, when traversing the side of a vehicle, the arm goes beyond the rear end of the vehicle stops and pivots 90° to begin a sweep of the rear surface. In so doing, the downwardly-directed nozzles cover a sector-shaped area of the trunk lid three times and the horizontally-directed nozzles spray into empty space for a significant period of time. At a minimum, this is wasteful of chemicals.

SUMMARY OF THE INVENTION

The present invention provides an apparatus for spraying fluids onto the external surfaces of an object which is stationary in a predetermined treatment area, e.g., an automobile parked in a laundering area, by causing one or more arm-like spray nozzle carriers to move through a path which causes a set of vertically-arranged, horizontally projecting fluid nozzles to substantially circumscribe the object while a set of horizontally-arranged, vertically projecting fluid nozzles cover the plan-view area of the object. Fluid is supplied to the nozzles with additives and pressures chosen and regulated to achieve the desired result. Coverage of the object is achieved in part by rotation of the nozzle carrier or carriers and in part by linear translation of the carrier or carriers via a carriage mounted on an overhead track which also provides structural support.

In the hereinafter-illustrated forms, the apparatus of the subject invention comprises at least one inverted L-shaped spray nozzle carrier which is pivotally mounted at or near the inboard distal end thereof to a powered pivot system which in turn is mounted on an overhead carriage for longitudinal movement over and relative to the vehicle. The combination of pivotal and longitudinal movements are such as to cause the arm and the nozzles therefor to circumscribe an object in the laundering area, thus to provide full coverage but without undesirable overlap.

In the preferred and fully accessorized embodiment, the carriage arrangement provides for lateral as well as longitudinal displacement of the pivot center relative to the treatment area. With this capability, pivotal movement, lateral movement, longitudinal movement and pressure selection may be programmably coordinated to perform high pressure treatment cycles at optimal distances from the side surfaces of the treated object while low pressure cycles are carried out in such a way as to promote efficiency through time saving. By way of example, a dual spray arm system affords simultaneous coverage of both sides of a vehicle in a laundering area during that portion of a cycle in which fluid is sprayed at low pressure. The nozzle-carrying arms move in mirror-image or "butterfly" fashion to achieve maximum coverage while the pivot center for the arms moves along a line corresponding with the longitudinal centerline of the vehicle. However, for the high-pressure phase, the left and right arms of a two-arm system are activated separately and each arm is placed at optimal nozzle-to-vehicle spacing during its operating time.

The spray apparatus is shown herein in combination with an overhead, fixed support structure preferably constructed of aluminum beams. The illustrative structure comprises spaced-apart, parallel longitudinal beams adjustably clamped to cross beams which are in turn adjustably clamped to vertical corner posts to facilitate installation as well as to tailor system size as desired.

Further describing the preferred embodiment; i.e., the embodiment having the greatest number of features, a carriage is mounted on spaced-apart, parallel longitudinal overhead beams for movement therealong. Longitudinal translation is provided by means of wheels, preferably coated on contact surfaces to reduce wear, and driven to provide controlled displacement at selected times in a wash/rinse cycle sequence as programmed. Within the carriage, a shuttle is provided for lateral or cross-wise movement over beams bolted between end plates on the carriage structure. The shuttle carries the pivot structure for the spray arms as well as the pivot drive motor and the shuttle drive mechanism, all of which are controlled to follow programs residing in, for example, the memory of a programmable digital processor.

Drive motor speed as well as pressure variations are preferably controlled by generating variable frequency control signals and applying those signals to suitable devices such as pumps and ac motors.

Object edge position inputs are provided, for example, by optical or sonic signal-emitting components such as photo cells and sonar transducers, or combinations thereof, all readily commercially available, mounted on the spray arms and various other places. The position signals are fed to the processor to locate the centerline and outside edges; i.e., peripheral surfaces, of the vehicle to direct the system to perform the longitudinal, lateral and pivotal motions in a correlated way. For components, such as the spray arms, which pivot or rotate, commercially available encoders are used to generate pulses indicating increments of angular motion. These pulses are readily counted and the counts converted into distance quantities so that the position of the spray arms can be determined and controlled at all times.

The preferred system is user-programmable, data-collecting, and fault-detecting. The input devices mentioned above together with limit switches, flow meters and the like, define a home position for the carriage, the shuttle and the spray arms. All movements are referenced to the home position and the system may default to it in the event of a loss of signal.

The spray nozzles are suitably attached to supply hoses and conduit made flexible and pivotal to accommodate movement between fixed supply tanks and movable spray arms. Where multiple chemicals are used in sequence, supply valves are timed to cause one chemical to be purged or spent from the system prior to beginning another pass calling for another chemical or treated water.

Various other features and advantages of the invention are hereinafter described. For example, the spray arms are provided with multi-axis "breakaway" sections which "give" non-destructively in the event of encountering obstructions and provide a fault-indicating signal to shut down system operation until a correction is made.

BRIEF DESCRIPTION OF THE DRAWING

FIG. 5 is a front perspective drawing of a carriage and shuttle assembly in the embodiment of FIG. 4;

FIG. 10 is a block diagram of a motor control circuit; and

DETAILED DESCRIPTION OF THE ILLUSTRATIVE EMBODIMENTS

Figure 1:
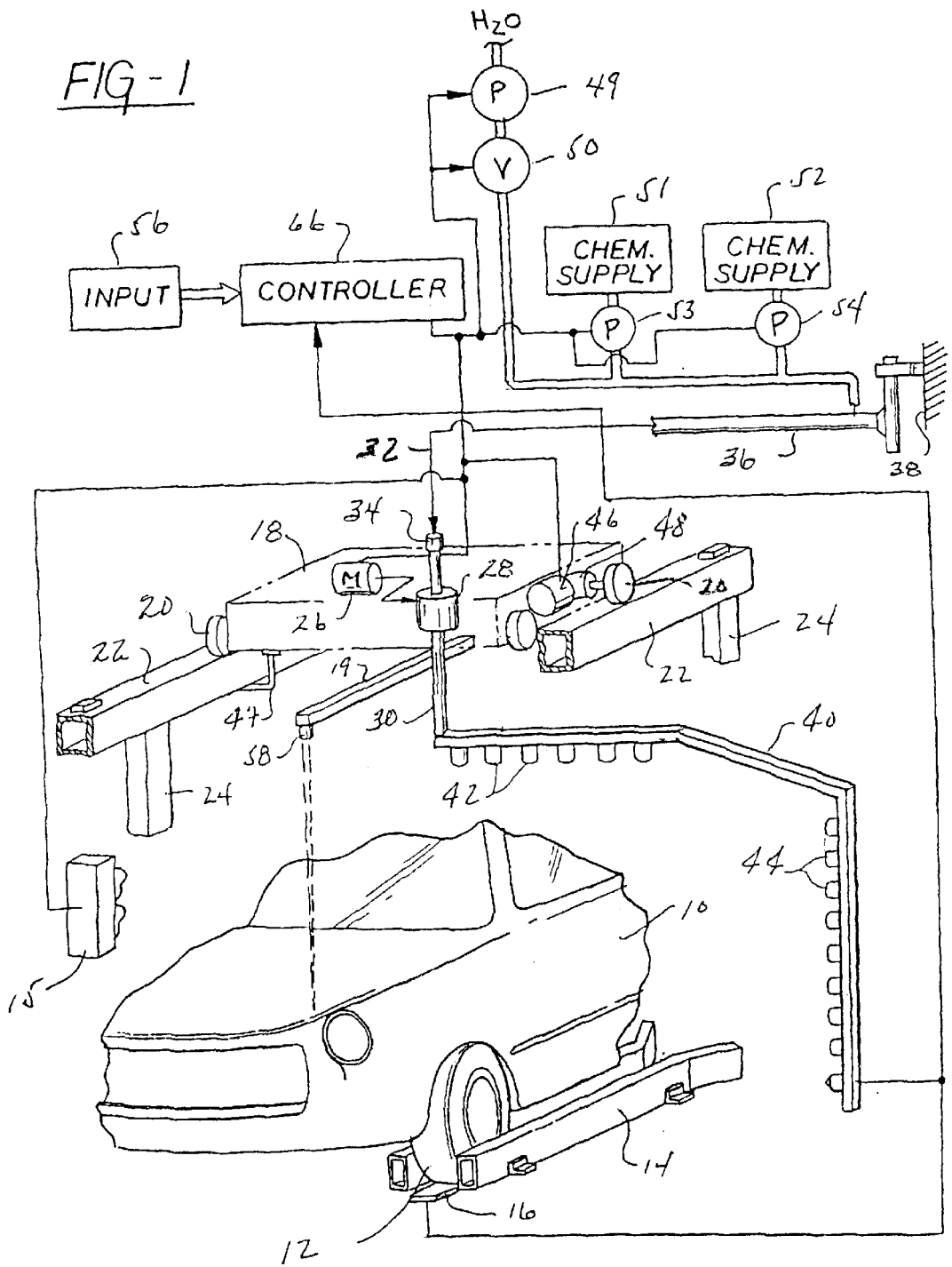
FIG. 1 is a schematic diagram of a practical embodiment of the invention using a single spray nozzle support arm.
Figure 2:
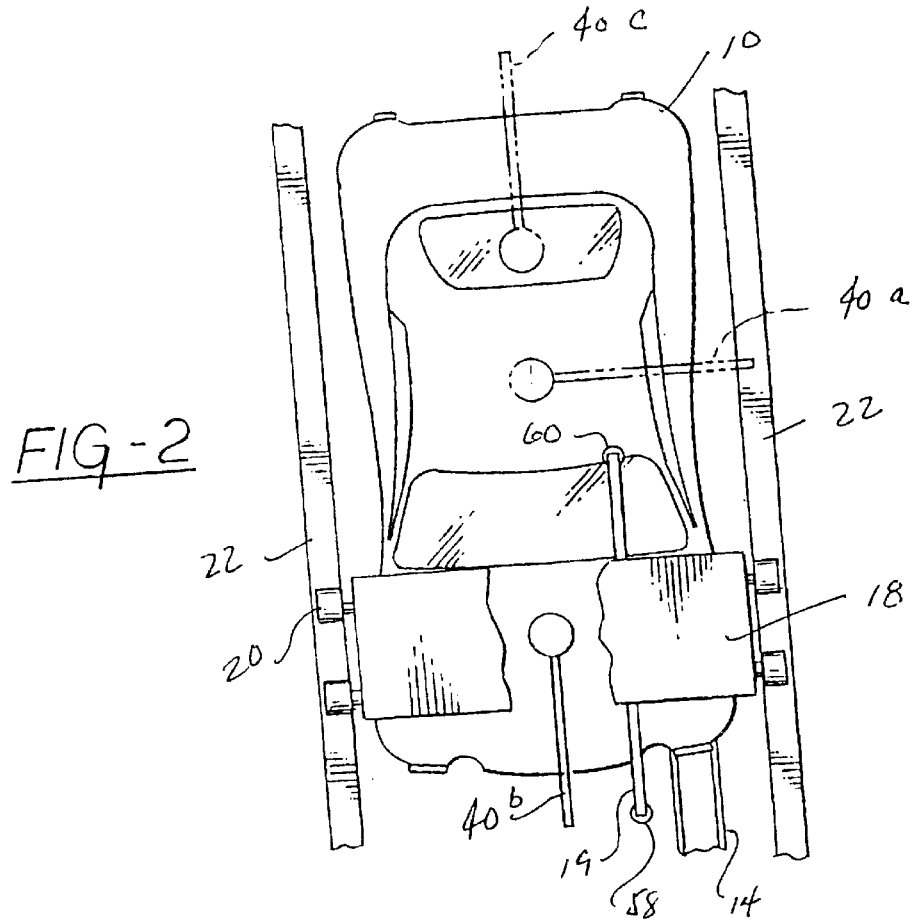
FIG. 2 is a plan view of the FIG. 1 embodiment showing various positions of the spray arm.

Referring first to FIGS. 1 and 2 where the components of a single-arm embodiment are schematically shown, a representative portion of a conventional passenger vehicle 10 has a front left wheel 12 positioned by guides 14 suitably attached to the floor of a vehicle laundry bay. A treadle 16 is mounted on the floor of the bay near the forward extremity of the guides 14. When depressed by the front tire of vehicle 10, treadle 16 generates an electrical signal providing input data to a controller 66 to operate a signal light 15 providing stop and go cues to the driver of vehicle 10. Treadle 16 also provides the driver with a tactile cue that the vehicle is in the correct position.

The foregoing and following description assumes that the vehicle 10 is driven into the laundry bay, properly located and driven forward out of the bay by a driver at the proper times. As persons skilled in the art will know, the wash bay may instead be equipped with a conveyor to position the vehicle.

An overhead carriage 18 having cushion surfaced wheels 20 is mounted for longitudinal, fore and aft movement over the vehicle 10 by means of parallel spaced apart aluminum beams 22 carried by vertical corner supports 24. The supports 24 are wide enough to permit the vehicle 10 to pass between them without interference and long enough to place the beams 22 and the carriage 18 well above the vehicle to prevent undesirable mechanical interference. The length of the beams 22 and the allowable longitudinal travel of the carriage 18 may be equal to or somewhat less than the overall length of the longest expected vehicle as hereinafter described. Alternatively, the beams 22 may extend to and be used to carry other equipment as desired. By way of example, beams 22 may be twenty feet long and spread about twelve feet apart.

A motor 26 mounted on the carriage 18 and operates through an angle encoder 28 to drive a hollow output shaft 30 about a vertical axis which is essentially centered in the laundry bay. The shaft functions as a mechanical element and as a fluid conduit and is connected to a supply line 32 through a swivel coupling 34. Fluid supply line 32 is carried in part by a boom 36 which is pivotally mounted on a bay wall 38 to permit it to accommodate travel of the carriage 18. Between the boom and the coupling, supply line 32 is preferably flexible reinforced rubber.

Hollow shaft 30 is coupled to a hollow, rigid arm 40 of essentially inverted L-shape carrying horizontally-arranged, vertically downwardly-aimed spray nozzles 42 and vertically-arranged, horizontally-inwardly-aimed nozzles 44. The horizontal dimension of arm 40 is such as to extend from the centerline to about 14 inches beyond the side edge or periphery of the largest vehicle to be laundered. The vertical dimension is approximately equal to the height of the vehicle plus about 14 inches.

The arrangement shown in FIGS. 1 and 2 and described above has the advantage of allowing continual, unidirectional rotation of the shaft 30 during operation with no wind-up of the supply line 30. Motor 26 need only turn, for example, in a counterclockwise direction. As will be apparent from the following, however, an equivalent function can be achieved through alternate pivot-direction reversals in which case the swivel coupling 34 can be eliminated.

In the preferred arrangement shown, the carriage 18 is provided with a longitudinal displacement drive motor 46 which is connected to one of the wheels 20 through a gear box 48. Motor 46 is actuated by controller 66 to cause carriage movement either forwardly or in reverse as determined by a stored program. Although a direct connection from controller 66 to motors 26 and 46 is shown, it is preferred to interpose a variable frequency actuation signal source for speed control purposes as hereinafter explained with reference to FIGS. 4 through 9. A steel loop 47 encircles beam 22 as a safety measure to prevent carriage 18 from falling in the event of a derailment. Supply line 32 is connected to a water supply through a variable pressure pump 49 and a control valve 50 to provide water at either of two preset pressure settings according to the frequency of an actuation signal from a variable frequency signal generator as hereinafter explained. Additives are injected by tanks 51 and 52 by injection pumps 53 and 54 respectively. The additives may include soap, acid solution, alkaline solution and the like. In addition, a source of de-mineralized rinse water may be provided. All of the additives and/or main alternative water supplies are connected or disconnected to line 32 by controller 66 as required by the sequence of the stored program or programs.

Typical of vehicle laundries intended for public use, the FIG. 1 system is provided with an input device 56 such as a coin slot, bill slot, or keypad to start the sequence. Additional input devices such as transducers providing data to controller 66, may be provided as desired. These may include ph sensors, flow meters, liquid level sensors, temperatures sensors, electric eyes and the like. In the FIG. 1 system, a sonic transducer 58 is mounted on an arm 19 projecting forwardly of the carriage 18 to assist in locating the front vehicle 10 as hereinafter described. A similar arm and transducer 60 project from the rear of carriage 18, as shown in FIG. 2.

Operation—FIG. 1

A brief description of the operation of the FIG. 1 system will now be given with reference to FIGS. 1 and 2 of the drawing.

To start with, a "home position" for the arm 40 and carriage 18 is defined. The preferred "home position" is with the arm 40 extending to one side of the wash bay as represented by arm position 40a in FIG. 2. The longitudinal home position of carriage 18 is less important but may be at or toward the front of the bay where the typical wash program starts.

With arm 40 in the home position, the bay is clear for entry of vehicle 10. Once the vehicle reaches treadle 16 and stops, the laundry sequence starts. First, the carriage 18 is brought toward the forward position shown in FIG. 2 so that the transducer 58 can locate the front of the vehicle 10. The transducer 58 is a commercially available sonic ranging device tuned to provide one output level when the return signal comes from the floor level and another output level when the signal comes from any significantly higher plane such as occurs when the top or hood or rear deck of a vehicle is beneath the sensor. The transition from hood level to floor level as the carriage 18 moves forward locates the front of vehicle 10 and signals the controller 66 that it is safe to move the spray arm around to position 40b as shown in FIG. 2. The arm 19 ensures that the front of vehicle 10 is located before the carriage reaches the full forward position.

Pump 49, 53 and 54 and valve 50 are enabled in the programmed sequence to provide pre-soak or detergent spray at low pressure to nozzles 42 and 44. Motor 26 is activated to pivot arm 40 counterclockwise as shown in FIG. 2 while motor 46 moves the carriage 18 forward at a coordinated rate to permit nozzles 43 to clear the front corner of the vehicle 10 and become repositioned adjacent the driver's side of the vehicle; i.e., the right side as seen in FIG. 2. Motor 46 is then activated to produce a front-to-rear pass at a controlled rate along the driver's side. The rear-wardly projecting sonic transducer 60 locates the rear of the vehicle and signals controller 66 when it is time to move arm 40 to the position 40c.

When the rear of the vehicle is reached, the motor 26 is activated to pivot arm 40 to position 40c shown in FIG. 2. When the rear corner is cleared, the carriage motor 46 may be activated to bring the carriage 18 slightly forward and, when the arm reaches the position 40c, reversed to allow the arm to clear the next corner.

As mentioned above, the most time-efficient operation is to continue to move arm 40 counterclockwise until it has circumscribed the entire vehicle and returned to position 40b. This is not only efficient timewise, it allows a single chemical to be sprayed over the entire vehicle during a continuous sweep of arm 40. Before arm 40 reaches the 40b position, the valves and pumps 50, 53 and 54 are reset to start the next chemical solution through supply line 32. The timing must be empirically determined as it will vary according to the length of supply line between tanks 51, 52 and the spray nozzles 42; i.e., a longer run requires a longer purge time at a given flow rate. The objective is to have the line 32 purged and the next solution ready as the spray arm reaches the 40b position so that the next sweep may begin immediately.

This sequence is repeated for as many cycles as are in the selected program; pressure settings being varied as desired. A "premium" wash may involve multiple wash or "prep" passes and multiple rinse passes. Low pressure is used for prep and rinse, high pressure is used to wash.

When the wash/rinse process is complete, arm 40 is returned to the 40a "home" position as the signal light 15 is again switched to green. Vehicle 10 exits the bay.

FIG. 3

Figure 3:
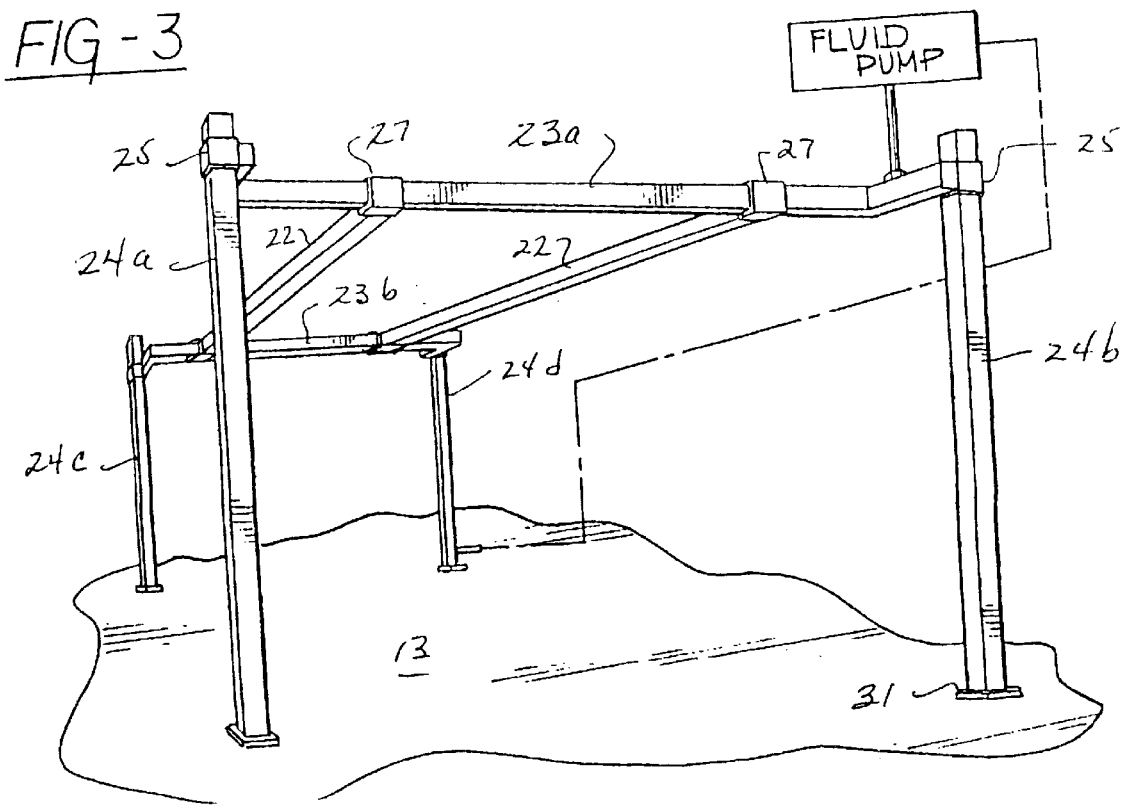
FIG. 3 is a perspective view of an illustrative overhead support structure for use in the invention.

Referring to FIG. 3, the details of an aluminum beam overhead support system are shown. The illustrated embodiment comprises four hollow, square section vertical beams 24a, 24b, 24c and 24d bolted to a poured concrete floor 13 in a vehicle laundry building by means of base plates of which 31 is representative. The beams 24 are preferably constructed of 4 inch by 6 inch aluminum box sections for corrosion resistance but can be made of steel and/or numerous other materials. They are located in an essentially rectangular plan view pattern of approximately 20 feet in longitudinal dimension and approximately 12 feet in lateral dimension. These dimensions are representative of those chosen for a conventional vehicle commercial car wash and other dimensions may be chosen for other applications including vehicular and non-vehicular applications. Cross beams 23a and 23b are mounted between uprights 24 by means of clamps 25 which may be loosened to provide sliding displacement between the clamp collars and the uprights thereby to select the exact vertical position for the beams 23. The collars of the clamps 25 may thereafter be tightened to hold the beams 23 in the desired position.

Longitudinal beams are mounted in parallel, spaced relation between cross beams 23a and 23b by means of clamps 27 which can be loosely assembled to permit sliding adjustment relative to the cross beams 23. Clamps can be tightened on beams 23 simply by turning screws between opposing clamp sections to secure beams 22a and 22b in place. This adjustable relationship allows the longitudinal beams 22 to be centered relative to a wash lane even if the lane and/or beams 24 are not centered relative to the building.

A source of heated fluid, either air or liquid, is connected to the beam structure to heat the interiors thereof in cold weather. One or more return lines are provided as according to the design of a particular system.

FIGS. 4–7

Referring to FIGS. 4 through 7, a second embodiment of the invention is schematically shown in combination with the overhead beam system of FIG. 3 and a conventional automotive vehicle 10. In this embodiment, the carriage 18' is again supported by wheels 20' on beams 22a and 22b. A drive motor and gearbox arrangement 46, 48 provides power for variable speed, bidirectional, longitudinal movement by way of rubber tired drive wheels 150 connected by shaft 152. Wheels 150 engage the bottom surfaces of beams 22a and 22b. Flanged idler wheels 20' engage the tops of the beams to provide guidance and stability. Carriage 18' comprises end plates 62 and 64 interconnected by corner struts 108 and cross beams 70 and 72 bolted between the end plates in spaced, parallel relationship. A shuttle 74 is mounted on beams 70 and 72 by way of wheels 76 and 77 to provide a lateral translation capability as well. A bidirectional variable speed and motor 78 operates via a belt 160 mounted on sprockets 162 as hereinafter described to move the shuttle 74 along the cross beams 70 and 72 as desired.

Figure 6:
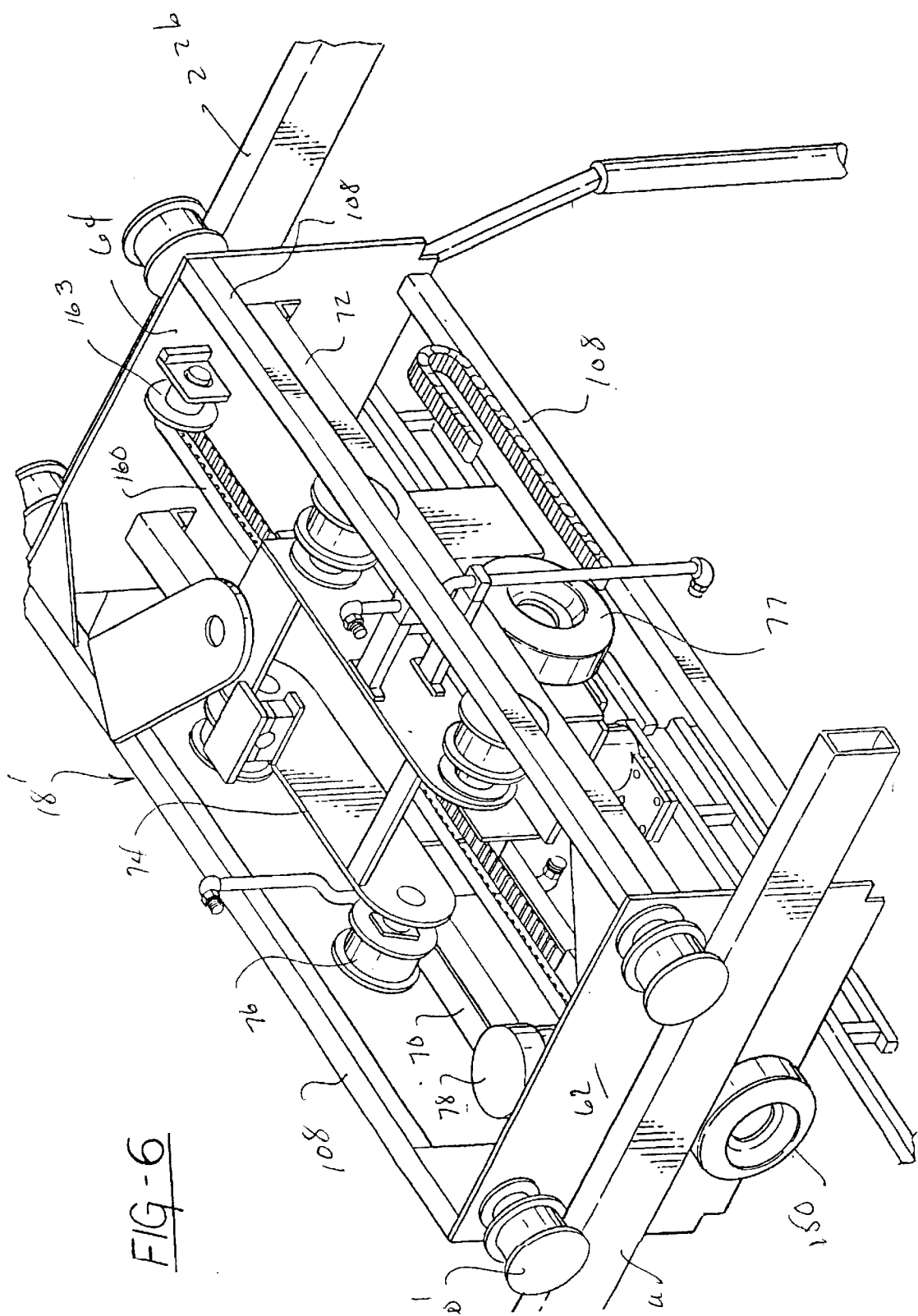
FIG. 6 is a top perspective view of the carriage and shuttle of FIG. 5.

Belt 160 has its opposite ends attached to opposite left and right sides of the shuttle 74 and is stretched between sprockets 162 and 163 mounted to the end plates 62 and 64. A belt transitioner is preferably provided. When motor 78 turns sprockets 162 clockwise, for example, shuttle 74 moves to the right as seen in FIG. 5. When motor 78 turns sprocket counterclockwise, the shuttle moves to the left. The belt is shown in FIGS. 5 and 6 to have teeth moulded into it. Sprocket 162 has corresponding teeth so no slip can occur in the drive system operation.

Figure 4:
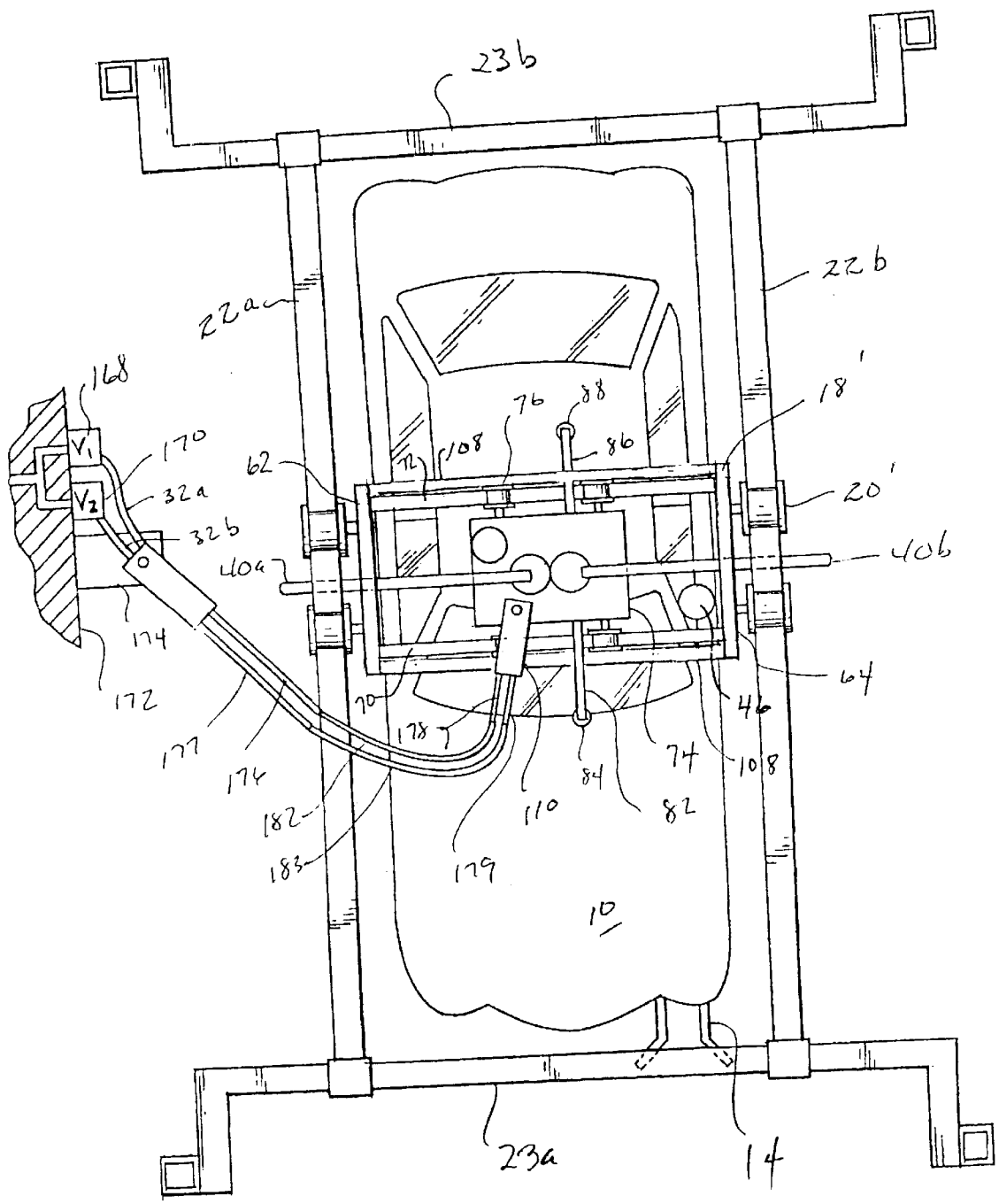
FIG. 4 is a plan view of a second embodiment of the invention employing a pair of spray nozzle support arms and both longitudinal and lateral movement capability.

As is further schematically shown in FIGS. 4 and 6, the shuttle 74 carries essentially centrally thereof a pair of spray arms 40a and 40b, each of which is essentially of the inverted L-shaped configuration shown in FIG. 1. Arm 40b is directly driven by motor 26. To ensure coordinated but reversely-similar movement of arm 40a, the outside of the shaft driven by motor 26 is provided with a large diameter plastic gear surface which meshes with a gear 80 to drive arm 40a. Clockwise rotation of arm 40b results in counterclockwise rotation of arm 40a and vice-versa.

Arm 40a has a hollow, fluid conduit vertical portion fitted with nozzles 44 exactly as the FIG. 1 embodiment. The overhead nozzles 42, however, are mounted on a manifold 117 suspended about 2 inches below the horizontal portion of arm 40a to provide hose clearance.

In the embodiment of FIGS. 4–7, the supply line is connected to each of two valves 168 and 170 mounted on the bay wall 172 above a pivot bracket 174. Separate supply lines 32a and 32b extend from the valves 168 and 170, respectively, to the spray arms 40a and 40b, respectively. Lines 32a and 32b have both rigid and flexible portions; rigid portions 176, 177 extend from plate which is pivotally mounted to wall bracket 174. Additional rigid lengths 178 and 179 are mounted on a plate 110 which is pivotally attached to the frame of shuttle 74. Flexible lengths 182, 183 connect the rigid lengths 176, 177, 178, 179 and provide enough movement to accommodate the entire length of carriage and shuttle translation.

An arm 82 projecting out ahead of the shuttle 74 carries a sonic ranging transducer 84 aimed downwardly at the floor and/or at the top or hood or deck surface of vehicle 10. A second arm 86 projects rearwardly of shuttle 74 and carries a second sonic transducer 88. Transducers 84 and 88 are used in finding the front and rear extremities of the vehicle as previously described. An optical transducer 90 on arm 40a is aimed downwardly toward a floor reflector 190 normally disposed partly beneath vehicle 10 but of sufficient lateral dimension to extend outwardly from even the widest vehicle expected. Transducer 90 is used to find the passenger side of the vehicle and, from that location, the centerline of the vehicle. This is achieved by moving the shuttle 74 laterally with arms 40 in the fully oppositely extending lateral portions.

The location of the driver's side of vehicle 10 is essentially determined by wheel guides 14. The average vehicle 10 measures about 5 to 8 inches from tread center to outside body edge and this is sufficient to locate one side of the vehicle. The center line and the passenger side body edge, must be precisely located by the transducer 90. The math to find the centerline of a vehicle is fairly simple and is programmed into controller 166. The driver's side edge is presumed to be six inches outside of the center of guides 14. The passenger side edge is found by counting pulses from a home position to the appearance of the unknown side edge in the view field of transducer 90 and adding the count to a constant representing the distance from home position to the passenger side edge. One-half of the total identifies the lateral coordinate of the centerline.

Figure 7:
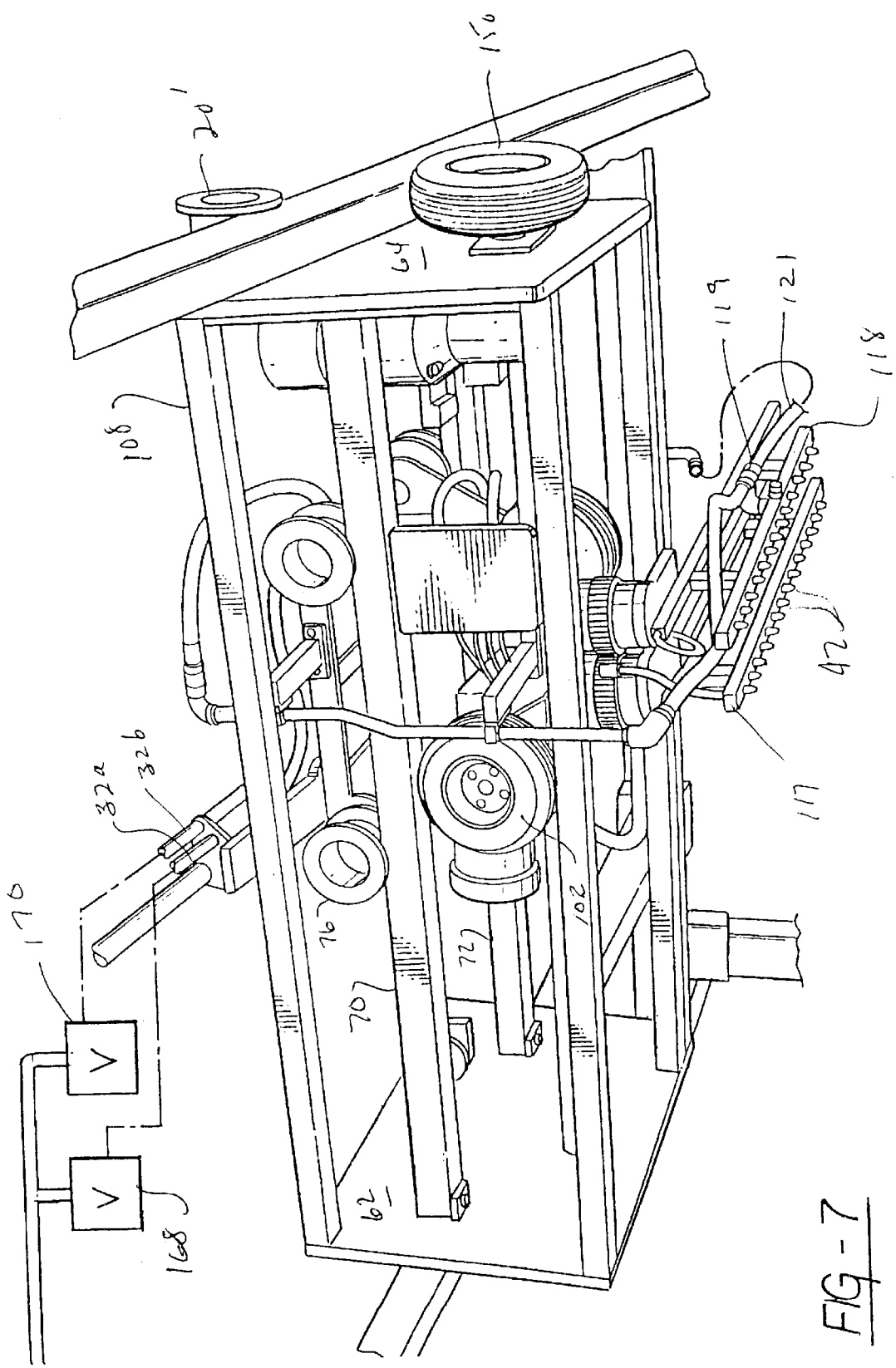
FIG. 7 is a bottom perspective drawing of the carriage and shuttle assembly of FIG. 5.

Referring now to FIGS. 6 and 7, a preferred packaging arrangement for the system of FIG. 4 is shown to comprise a carriage 18' having solid end plates 62 and 64 joined by tubular stainless steel corner struts 108. Teflon surfaced wheels 20' ride on the top surfaces of the longitudinal rails 22a and 22b as previously described. In addition, rubber tired drive wheels 150 are biased against the bottom of the rail 22a to provide longitudinal drive by way of the motor 46' and a gearbox 48. Cross rails 70 and 72 are bolted between the end plates 62 and 64 as previously described to provide for lateral translation of the shuttle 74. Teflon cushioned wheels 76 ride on the cross rails 70 and 72 and a rubber tired idler wheel 102 bears against the bottom of the cross beam 72 to stabilize the shuttle structure. Steel cables or rigid tubes are preferably welded or bolted in place to maintain the carriage 18' on the beams 22 and a similar arrangement can be used to provide security for the shuttle 74 relative to the carriage.

As shown in FIG. 7, the twin arm embodiment uses for the upper or horizontal portion solid arms with spray nozzle manifolds 117 and 118 rigidly mounted directly beneath the arms to provide clearance for the supply hoses. Tee fittings 119 and additional high pressure rubber hoses 121 may be used to connect the fluid supply line to the lower nozzles 44 on the vertical portion of each of the arms 40a and 40b. Each valve 168, 170 has two conditions: open and closed. In this fashion, a single, variable speed pump can supply both lines 32a and 32b either independently or simultaneously. As hereafter explained, both valves open for low pressure operations including pre-soak and rinse. The valves are opened one-at-a-time for high-pressure operations according to a stored program.

Figure 9:
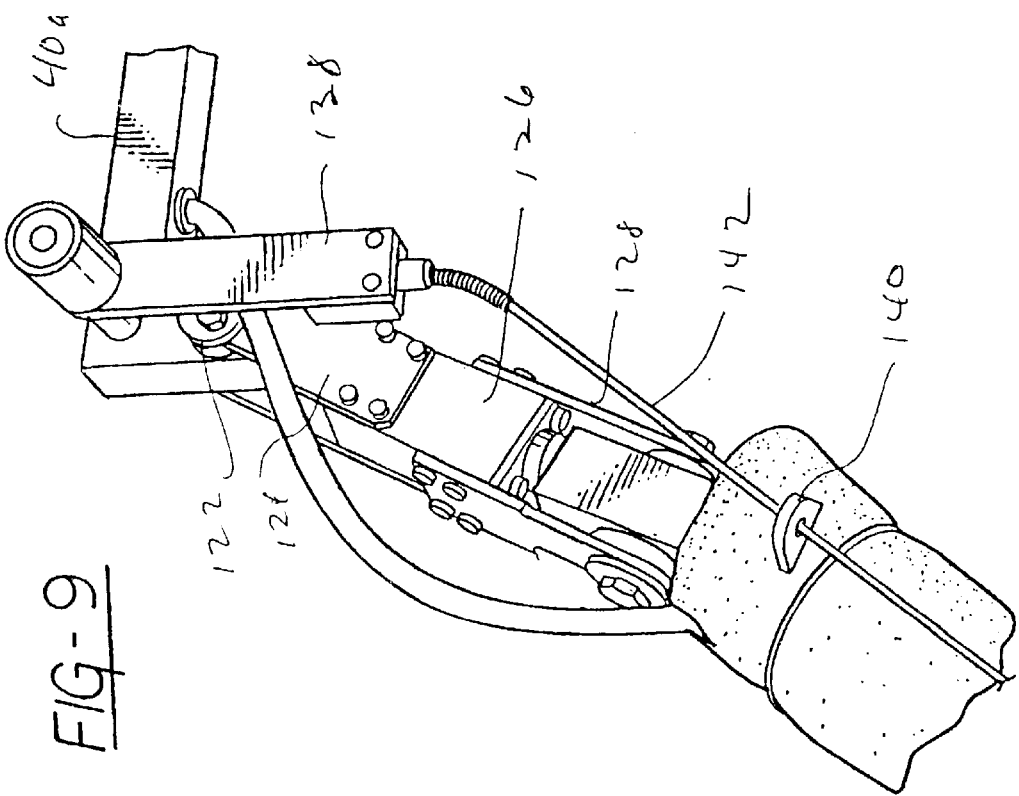
FIGS. 8 and 9 are perspective views of a break-away mount for the spray arms of the embodiment of FIGS. 1 and 4.
Figure 8:
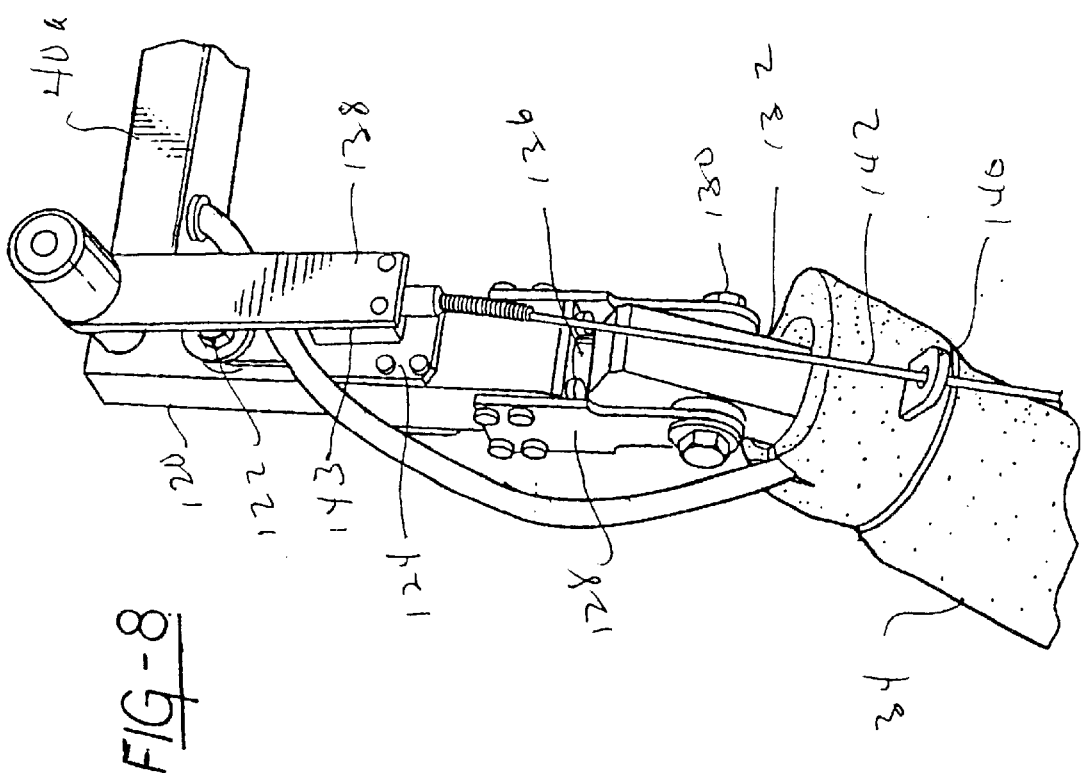

FIGS. 8 and 9

Referring now to FIGS. 8 and 9 an additional safety feature of the system shown in FIGS. 1–6 will be described. The apparatus illustrated in FIGS. 7 and 8 is effectively a two axis double detent which allows each of the arms 40a and 40b to "break away" in both the longitudinal and lateral directions in the event of a system malfunction. The breakaway feature permits the lower or vertical portions of each of the arms 40*a* and 40*b* to yield nondestructively to an applied force due to, for example, inadvertent contact between the arm and the side of a vehicle.

As shown in the Figures, representative arm 40*a* has a rigidly attached L shaped end portion 120 which makes the turn between the horizontal and vertical portion of the arm. A first clevis 124 is connected to the arm portion 120 by way of a pivot 122 which permits pivotal motion of the lower portion of the arm about one axis. Although not shown in detail in FIGS. 7 and 8 a ball and spring type detent mechanism is provided before holding the apparatus in the configuration shown in FIG. 8. The detent yields when an outward force is applied to permit the structure to assume the condition shown in FIG. 9.

The spacer 126 is connected between the first clevis 124 and a second clevis 128 which is turned at 90° relative to the clevis 124. A second ball and socket detent mechanism 136 operates between the lower arm portion 132 and the spacer 126 with the assistance of a second orthogonal pivot 130 to permit the lower arm portion 132 with its foam protective jacket 134 to pivot in a second direction relative to the upper arm portion 120.

To detect and inform the controller 66 whenever a breakaway action occurs, a spring arm 142 activating a micro switch 143 extends downwardly from a bracket 138 and passes through a metal loop 140 mounted on the lower arm portion 134. When the mechanism is in its normal operating condition as shown in FIG. 7; i.e., with both of the detents seated, the spring arm 142 passes through a hole in the loop 140, is unflexed and permits the micro switch 143 to remain in the open circuit position. However, when either of the detents is unseated by pivotal motion about either pivot 122 or 130, loop 140 causes a spring arm 142 to flex and to close the micro switch 143. This switch is wired to the controller 66 to provide a fault condition signal which may, when the controller 66 is properly programed, shut the system down and provide a record of the fault condition.

Several equivalent default detecting structures are available. For one, the arm 142 may be constructed of spring material over its entire length rather than just at the upper end as shown. A second alternative involves an electric eye mounted on the bracket 138 and looking downwardly on a target on the lower arm 132. Whenever the target moves away the optical sensor changes signal condition and alerts the controller 66 of the fault condition. Strain sensing devices such as piezoelectric crystals and force transducers can also be used for this purpose as can magnetostrictive and inductive and/or capacitive devices as well.

FIG. 10

FIG. 10 shows some detail of the controller 66. As shown in this figure the controller 66 includes Mitsubishi E500 variable frequency motor speed controllers 200, 202, 204 and 206 which receive DC signals from a digital to analog converter 208 and convert those signals to AC control signals for application to the reversible AC variable speed motors 28 and 46 which provide the two linear translation drives, to motor 26 which operate the pivotal spray arm drive, and to pump 49 which controls pressure to the nozzles via valves 168 and 170. The digital signals come from the analog output of a microprocessor 210 having an input/output section 212. Inputs to the circuit 212 come from the operating system transducers including limit switches, micro switches, liquid level sensors and other transducers as described above.

As also described above, the controller 66 is provided with a state-of-the-art display and operator input station which is typically within the owner controlled portion of the wash bay and will not be described herein in detail. In addition, the controller 66 is provided with user supplied inputs from a key pad, currency receipt slot and/or other equivalent device.

Operation—FIGS. 4–12

As indicated above the FIG. 4 device is typically parked in a home position with the shuttle 74 and carriage 18' centered relative to the structure shown in FIGS. 4,5 and 6 and with the arms 40*a* and 40*b* extending outwardly in laterally opposite directions. This clears the laundry bay for entry and exit of the vehicles being treated. Once the vehicle enters the wash bay and is properly located on the previously described treadle, and all other system operating conditions are satisfied; e.g., an input key pad signal of the proper code is received and/or the appropriate amount of currency is furnished by a user, the laundry sequence begins.

The first step is to locate the center line and outside boundaries of the vehicle as explained above, the driver's side is fixed by guides 14, the front is located by sonic device 58 and the passenger side by optical device 90. Once the passenger side is located and the location given an identifying number corresponding to a pulse count from the lateral encoder, the centerline of the vehicle is automatically identified by one-half that pulse count and stored in temporary memory for later operation. For this purpose the shuttle drive motor is first activated to move the shuttle laterally toward the passenger's side of the vehicle until the optical sensor 90 carried by the spray arm 40*b* sees the floor mounted reflector 190 and locates the passenger's side boundary of the vehicle 10. Thereafter the longitudinal drive motor 46 is activated to move the carriage 18' forward until such time as the sonic transducer 84 locates the front boundary of the vehicle 10 and signals the system that it is safe to pivot the arms 40*a* and 40*b* to the full forwardly extending position. With the shuttle 74 centered relative to the center line of the vehicle, the low pressure prewash cycles are then executed by activating the pump 49 and opening both valves 168, 170 to supply the appropriate fluids through the supply lines 32*a* and 32*b* simultaneously to both of the spray arms 40*a* and 40*b* to spray all outside surfaces of the vehicle starting at the front end. The arms swing outwardly and simultaneously around the front corners of the vehicle and reassume the position shown in FIG. 4 while the longitudinal carriage drive moves the entire carriage longitudinally along the beams 22*a* and 22*b* toward the rear of vehicle 10 to spray fluid on the outside surfaces of the entirety of the vehicle. When the sonic transducer 88 indicates the presence of the rear of the vehicle the arms 40*a* and 40*b* are again permitted to butterfly and/or reversely pivot toward one another as shown in FIG. 11.

The next chemical is preferably switched into the system just before the arms reach the rearmost, parallel position, the time interval depending as described above on the length of the supply line 32 between the fluid source and the spray nozzles 42 and 44. The pump 49 is stopped when the first full cycle has been finished and the arms are pivoted back out to the laterally oppositely extending position and the carriage 18' is moved back to the full forward position of the vehicle. Omitting running the pump which the apparatus is in reverse insures that the chemicals applied to the vehicle are given the longest possible soak time. The next chemical is then selected and the operation described above is run a second time.

Appropriate chemicals may be applied in the low pressure operating condition as prescribed by the particular program.

Figure 11:
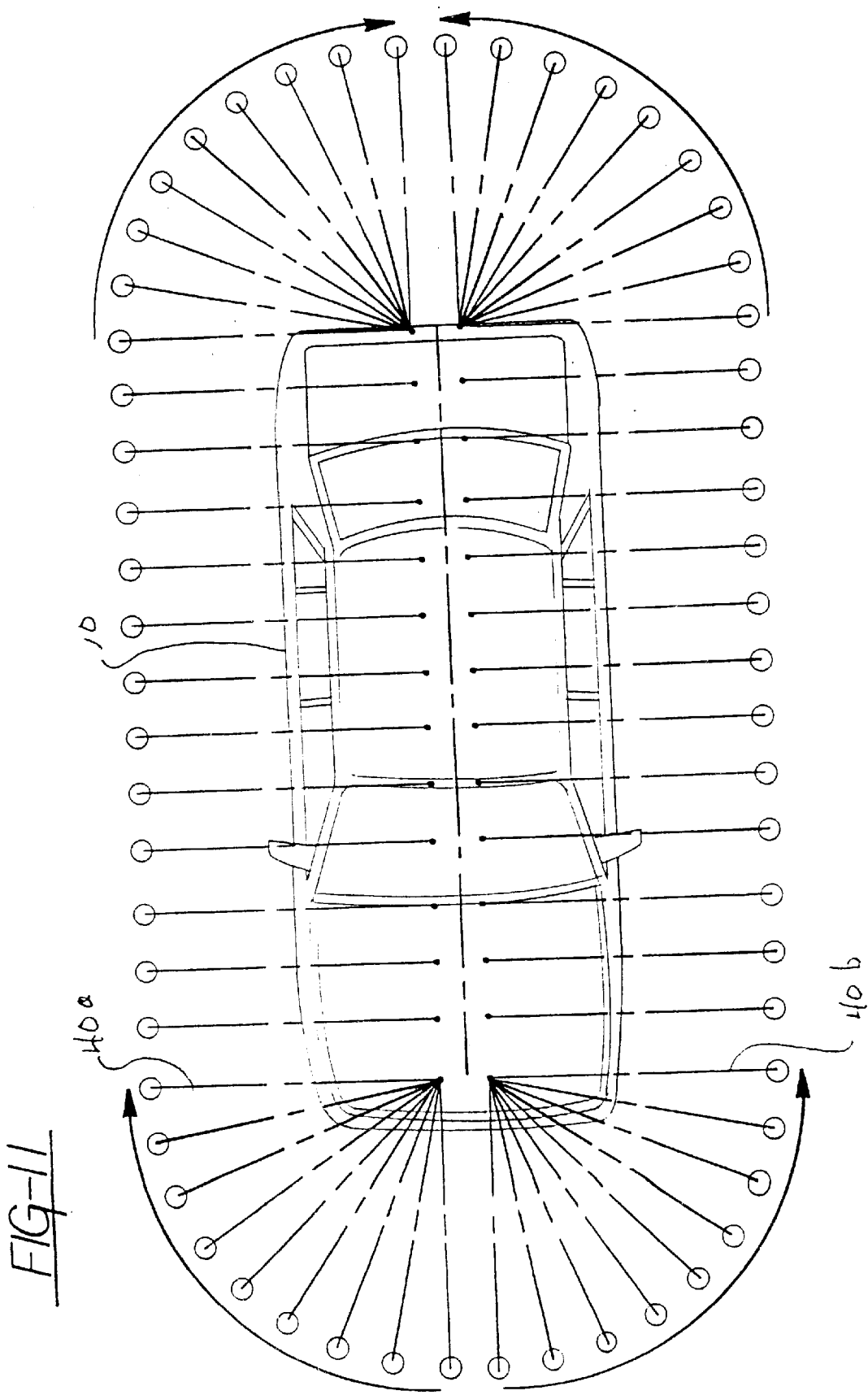
FIGS. 11 and 12 are schematic path-of-travel diagrams for the spray arms of FIGS. 4 and 5.

It should be noted, however, that in the low pressure cycles, the shuttle 74 is centered relative to vehicle 10 and shown in FIG. 11, arms 40a and 40b are at equal distances from the sides of the vehicle and are simultaneously spraying.

Figure 12A:
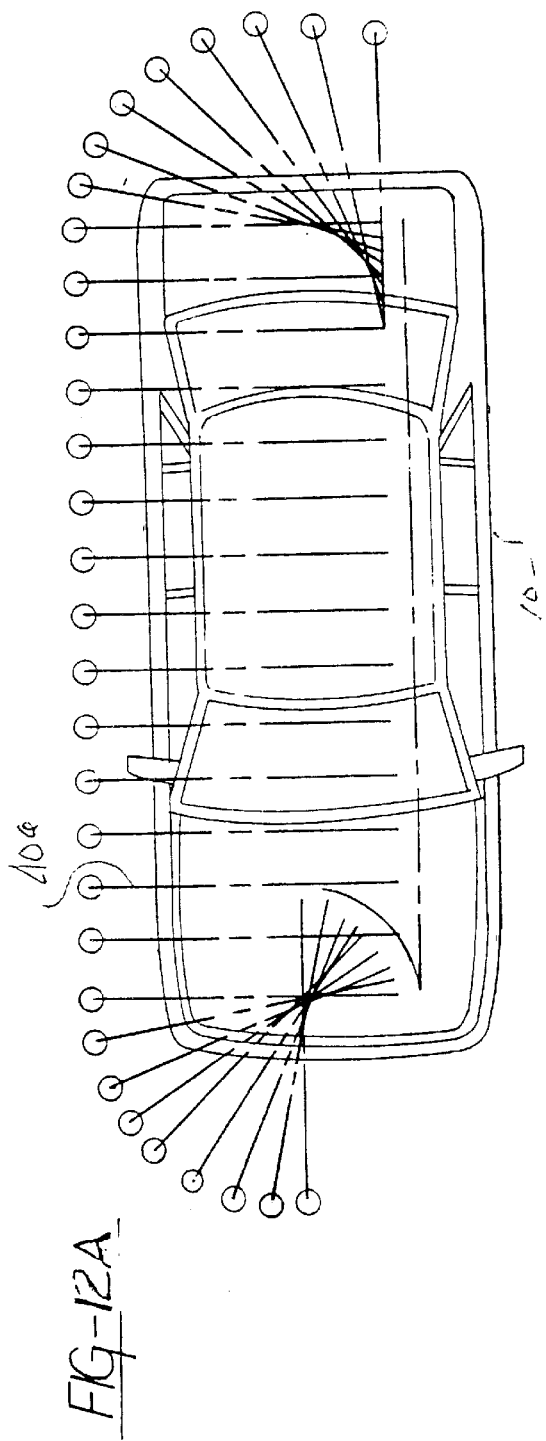
Figure 12B:
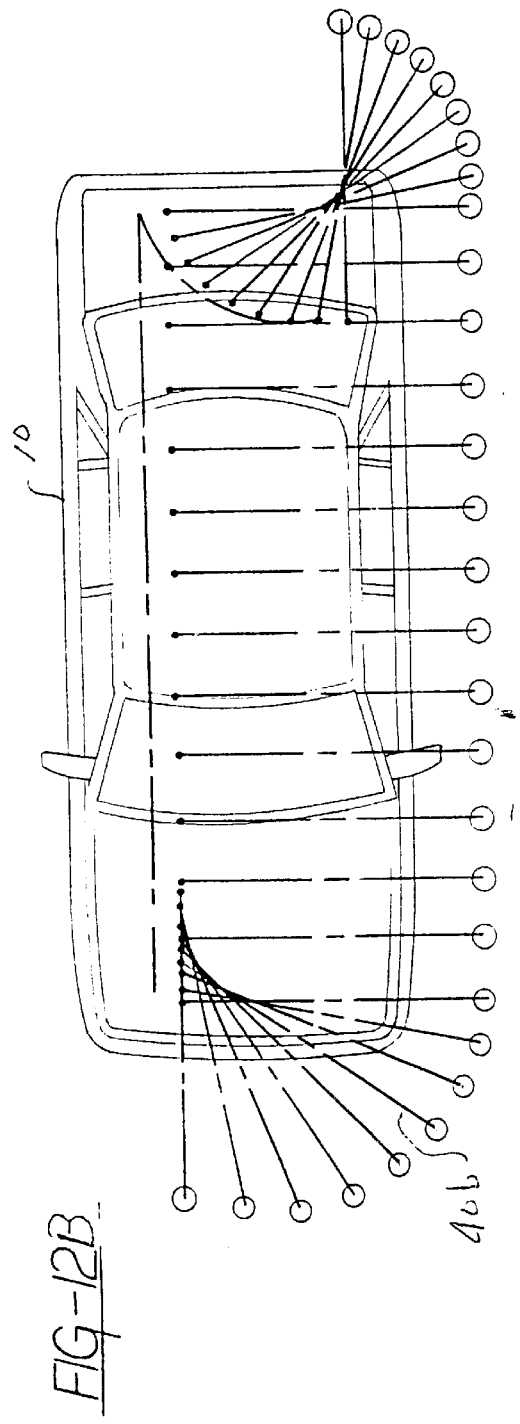

For the high pressure cycles, a different approach is taken: the spray arms 40a and 40b are supplied with fluid one at a time and the selected spray arm is maintained at the optimal position relative to the side surfaces of the vehicle which it addresses. This typically requires a non centered position of the shuttle 74 relative to the geometric center line of the apparatus and/or the vehicle as shown in FIGS. 12a and 12b.

Assuming the arm 40a is activated first, the shuttle moves from approximately the center of the vehicle to the right as shown in FIG. 4. As the shuttle reaches the right hand extreme as shown in FIG. 12a, the carriage 18' is moved forward while the arm 40a is rotated around the front left corner of the vehicle (as seen from the driver's prospective) to maintain the appropriate spacing. Thereafter the shuttle is moved back toward the center line of the vehicle but not necessarily to a position which is coincident with the center line because the objective at this point is to establish and maintain an optimal distance between the vertical portion of the spray arm 40a and the driver's side surface of the vehicle as shown in FIG. 12. This position is maintained as the shuttle moves the spray arm along the side of the vehicle and toward the left rear corner is viewed from the driver's prospective. Again the arm 40a is pivoted around the corner of the vehicle with the shuttle and carriage moving toward the rear to maintain appropriate spacing and then back toward the front as the arm arrives again at the fully rearwardly extended position.

At this point the opposite spray arm is activated and an inverse operation is performed with the vertical portion of the arm 40b maintained at the optimal spacing relative to the passenger's side of the vehicle 10. The high pressure spray on the passenger's side is conducted from back to front to conserve time. This combination of cycles may be repeated as many times as is desired.

It will be noted that because the motion of the arms 40a and 40b is of a "butterfly" type, they do not continue all the way around the vehicle in the fashion described with reference to the apparatus of FIG. 1. Therefore the "wind up" phenomenon requiring the swivel fitting 34 does not occur in the apparatus of FIG. 4 and no swivel fittings are required.

It will be apparent to those skilled in the art that the apparatus described herein may be modified or supplemented in various ways without departing from the spirit and scope of the invention. Moreover it will be apparent that the process inventions described herein may be carried out in various ways and with various apparatus departing only in substantial ways from the structure described herein while maintaining the essential functional identity.

What is claimed is:

1. Apparatus for spraying fluid onto an object in a treatment location having a floor and comprising:
   a support structure overhead the location
   a spray nozzle carrier arm of essentially inverted L-shape having a horizontal spray portion extending from an inboard end generally over the center line of the location to a second end at the periphery of the location; said arm further having a vertical spray portion essentially continuous with the horizontal portion and extending from the second end thereof downwardly toward the floor;
   spray nozzles carried by said arm;
   a powered pivot structure connecting said arm to said support structure to pivot said arm about a vertical axis passing substantially through the inboard end of the first portion whereby the vertical portion of the arm may be caused to circumscribe at least a portion of the area; and
   means for supplying fluid to the nozzles under pressure.

2. Apparatus as defined in claim 1 wherein said support structure defines a longitudinal path of travel and said apparatus further comprises:
   a carriage structure mounted for longitudinal movement over and relative to the treatment location;
   a reversible carriage drive system; and
   said powered pivot structure being mounted on said carriage.

3. Apparatus as defined in claim 1 further including a shuttle structure mounted on said carriage and including a shuttle drive system for selectively causing movement of said shuttle and pivot structure laterally of said support structure and carriage.

4. Apparatus as defined in claim 3 further comprising a programmable controller having outputs connected to the pivot structure, said carriage drive and said shuttle drive.

5. Apparatus as defined in claim 4 wherein said programmable controller includes means for programmably controlling the speed of movement of said carriage and shuttle drives.

6. Apparatus as defined in claim 5 wherein said programmable controller comprises a variable frequency generator.

7. Apparatus as defined in claim 5 wherein said programmable controller comprises a key pad input.

8. Apparatus as defined in claim 1 further including a resettable, breakaway joint disposed between and interconnecting said first and second carrier arm portions for permitting nondestructive relative movement between said portions when said second arm is subjected to a force.

9. Apparatus as defined in claim 1 wherein said means for supplying said nozzles with fluid comprises a fluid source and has multiple pressure settings.

10. Apparatus as defined in claim 1 wherein said support structure comprises a pair of spaced parallel hollow beams suspended over the washing area and extending transversely thereof, at least one longitudinal beam extending between and supported by said pair of beams;
    said apparatus further comprising a carriage mounted for powered reversible travel on said beams, and a shuttle structure mounted for powered reversible movement on said carriage.

11. Apparatus as defined in claim 10 further comprising means for adjusting the lateral spacing between said pair of parallel beams.

12. Apparatus as defined in claim 10 further comprising means for supplying heated liquid to the interior spaces of the beams.

13. A pressure washer for an object in a washing area comprising:
    a support structure over said area;
    a pair of spray nozzle carrier arms each being of essentially inverted L-shaped configuration and having a first portion extending from a center point toward the periphery of the area and a second contiguous vertical portion disposed adjacent to the area;
    spray nozzles carried by the $1^{st}$ and $2^{nd}$ portions of each of said carrier arms;
    a pivot structure connecting said carrier arms to said support structure at said center point to reversely pivot said carrier arms whereby the vertical portions of said carrier arms may be caused to follow reversely similar, essentially mirror image paths which together circumscribe the area; and means for supplying fluid to the nozzles under pressure.

14. Apparatus as defined in claim 13 wherein said support structure defines the longitudinal path of travel;

said apparatus further comprising a carriage structure mounted for longitudinal movement over and relative to the washing area, said pivot structure be mounted on said carriage for movement therewith.

15. Apparatus as defined in claim 14 further including a shuttle structure mounted on said carriage structure for bidirectional lateral movement relative to said arms.

16. Apparatus as defined in claim 13 further including a resettable breakaway joint disposed between interconnecting each of said first and second carrier portions for permitting nondestructive controlled relative movement between said portions.

17. Apparatus as defined in claim 13 further comprising a programmable controller for controlling the movement of said support structure relative to said washing area.

18. Apparatus as defined in claim 17 wherein said programmable controller comprises means for controlling the speed of movement of said carriage.

19. Apparatus as defined in claim 18 wherein said programmable controller comprises a display.

20. Apparatus as defined in claim 19 wherein said programmable controller comprises a key pad.

21. Apparatus as defined in claim 1 wherein said means for supplying said nozzles with washing fluid comprises at least two fluid sources.

22. A pressure washer for an object in a washing area comprising:

a support structure over said area;

a pair of spray nozzle carrier arms each being of essentially inverted L-shaped configuration and having a first portion extending from a center point toward the periphery of the area and a second contiguous vertical portion disposed adjacent to the area;

spray nozzles carried by the $1^{st}$ and $2^{nd}$ each of said carrier arms;

a pivot structure connecting said carrier arms to said support structure at said center point to reversely pivot said carrier arms whereby the vertical portions of said carrier arms may be caused to follow reversely similar, essentially mirror image paths which together circumscribe the area; and means for supplying fluid to the nozzles under pressure wherein said means for supplying said nozzles with washing fluid comprises at least two fluid sources.

23. Apparatus as defined in claim 22 wherein said support structure comprises a pair of spaced parallel beams dispersed over the washing area, at least one cross beam extending between and supported by said pair of longitudinal beams, and a shuttle structure mounted on the support for powered programmably coordinated movement along said beams.

24. Apparatus as defined in claim 22 further including means for determining the location of a vehicle in said area.

25. A method of pressure washing a vehicle which is disposed in a washing area comprising the steps of:

providing a spray nozzle carrier arm of essentially inverted L-shape having a first horizontal portion which is disposed over the area and a contiguous, second vertical portion which is disposed adjacent the periphery of the area;

causing said carrier arm to circumscribe at least part of the area and to pivot about an end of the arm which is generally over the center of the area; and supplying washing fluid to the nozzles under pressure.

26. A method as defined in claim 25 wherein the step of circumscribing is carried out so as to maintain a substantially constant spacing between the vertical arm portion and a vehicle in the area.

27. A method of washing a vehicle having top, front, rear and side surfaces while standing in a washing area comprising the steps of:

providing a pair of spray nozzle carriers each of essentially inverted L-shape and each having first horizontal portions which overlie the washing area and second vertical portions which are adjacent the washing area;

causing said carriers to pivot from the inboard distal ends of said horizontal portions in a reversely similar fashion so as to fully circumscribe said area and said vehicle while maintaining a substantially constant spacing from the side surfaces of said vehicle; and supplying said nozzle carriers with washing fluid under pressure.

28. A method of washing a vehicle in a washing area comprising the steps of:

providing a pair of reversibly similar spray nozzle carriers of inverted L-shape having a substantially common pivot center over the area;

moving the carriers through a butterfly pattern while moving the pivot center along and over the centerline of the vehicle while simultaneously supplying both carriers with fluid; and moving each carrier sequentially through a butterfly pattern at a predetermined optimal distance from the vehicle while supplying each carrier independently with fluid.

* * * * *